United States Patent [19]

Böddeker et al.

[11] 4,340,428
[45] Jul. 20, 1982

[54] SEMI-PERMEABLE ASYMMETRICAL MEMBRANCE AND PROCESS OF PRODUCING SAME

[75] Inventors: Karl W. Böddeker, Hamburg; Axel Wenzlaff, Escheburg, both of Fed. Rep. of Germany

[73] Assignee: Gesellschaft für Kernenergieverwertung in Schiffbau und Schiffahrt GmbH, Fed. Rep. of Germany

[21] Appl. No.: 164,027

[22] Filed: Jun. 30, 1980

Related U.S. Application Data

[63] Continuation-in-part of Ser. No. 28,262, Apr. 9, 1979, abandoned.

[30] Foreign Application Priority Data

May 10, 1978 [DE] Fed. Rep. of Germany ....... 2820265

[51] Int. Cl.³ .............................................. B29D 27/04
[52] U.S. Cl. ................................ 106/122; 106/193 R; 210/500.2; 264/41; 264/45.3
[58] Field of Search .......................... 264/41, 45.3, 49; 210/500.2; 106/122, 193 R

[56] References Cited

U.S. PATENT DOCUMENTS 3,486,946  12/1969  Duddy .............................. 264/41 X
3,497,072   2/1970  Cannon ............................ 264/49 X
4,234,528  11/1980  Nussbaumer et al. ................ 264/41

FOREIGN PATENT DOCUMENTS 2552282  6/1977  Fed. Rep. of Germany ...... 210/500

Primary Examiner—Philip E. Anderson
Attorney, Agent, or Firm—James E. Nilles

[57] ABSTRACT

A semi-permeable asymmetrical membrane, useful for water desalting by reverse osmosis and comprising cellulose acetate polymer, is formed from a casting solution in which there is incorporated, as a swelling medium, organophilic bentonite, that is, bentonite (preferably Montmorillonite) which has been directly reacted with di-methyl-di-stearyl (quaternary) ammonium chloride to have had its exchangeable cations replaced by long-chain hydrocarbons. The bentonite is swelled in dioxane, and the solution also includes acetone, equal parts of cellulose diacetate and cellulose triacetate, acetic acid and methanol. The steps of casting, cold water immersion and annealing are generally conventional. Incorporation of the bentonite results in high salt restraining capacity along with high product water flow and good flow stability.

10 Claims, 1 Drawing Figure

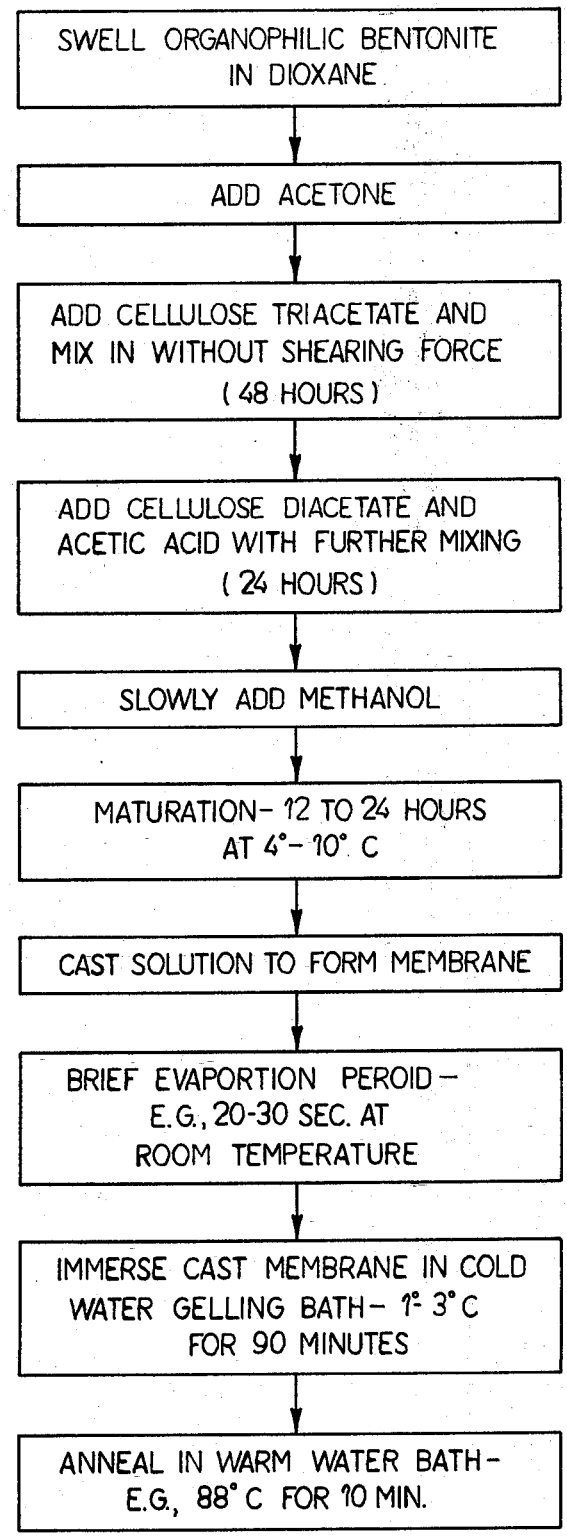

SEMI-PERMEABLE ASYMMETRICAL MEMBRANCE AND PROCESS OF PRODUCING SAME

RELATED PATENT APPLICATION

This application is a continuation-in-part of our application Ser. No. 28,262, filed Apr. 9, 1979, abandoned upon the filing hereof.

FIELD OF THE INVENTION

This invention relates to semi-permeable asymmetrical membranes which have high salt rejecting capacity and high flow stability, and which are therefore suitable for employment in sea water desalting by reverse osmosis; and the invention is more particularly concerned with a novel and improved membrane of that type and with a process of producing the same from a cellulose acetate casting solution that comprises a swelling medium which is incorporated in the casting solution during its preparation and which remains in the membrane.

BACKGROUND OF THE PRIOR ART

The semi-permeable membranes that are useful for water desalting by reverse osmosis are swollen (water retaining) polymer films which appear to be in a poreless phase in the film matrix and in which the salt and water solution components to be separated dissolve independently and move across by diffusion. The driving force for water transport is that part of the working pressure imposed upon the feed water (salt water) which exceeds the osmotic pressure of the feed water, while the driving force for salt transport is the salt concentration of the adjacent feed water itself.

Asymmetrical semi-permeable membranes, frequently described in technical and patent literature, consist of an extremely thin, practically nonporous surface film or skin over a sponge-like porous carrier sheet that constitutes the major thickness of the membrane. In the production of an integral-asymmetrical membrane, its cover sheet or skin, which constitutes the semipermeable membrane proper, is developed from one and the same polymer material as the carrier sheet. The carrier sheet, being porous, does not contribute significantly to desalting (see West German Pat. No. 2,552,282).

The capacity for rejecting salt is a characteristic property of the polymeric membrane material employed. It is almost independent of the thickness of the membrane. The product water flow depends upon the capacity of the polymeric membrane material to incorporate bound water (hydrophilism). The product water flow increases approximately linearly with decreasing sheet thickness (membrane thickness) and with increasing pressure difference across the membrane. This imposes a requirement for the thinnest possible membrane that is nevertheless capable of sustaining the working pressure.

The conventional procedure for producing integral-asymmetrical membranes, for example with typical secondary cellulose acetate for the entire membrane structure, comprises the steps of: (a) forming and homogenizing a casting solution consisting essentially of polymer, solvent medium and swelling medium; (b) spreading out the casting solution as a film that is typically of 0.3 mm. thickness; (c) permitting a portion of the solvent medium to evaporate to the air to preliminarily form the cover sheet; (d) immersing the film in a cold water bath to cause the non-polymeric components to be dissolved out while, during concurrent gelling, water is taken up by the membrane; and (e) heating or annealing the swollen membrane in a warm water bath, wherein the membrane solidifies itself in the previously established structure with a relatively small but significant reduction in its water content.

At every point, this process is controlled with a view to the permeability characteristics of the resulting membrane, so that the most important casting variables—next to the selection of the polymer material itself—are the period of evaporation of the freshly spread film in the air, and the temperature of the concluding warm bath annealing treatment.

A typical heretofore conventional casting solution consists of 25% by weight of secondary cellulose acetate (cellulose diacetate) as the membrane component proper, 45% by weight of acetone as the solvent medium, and 30% by weight of formamide as a water-soluble solution swelling medium (U.S. Pat. No. 3,344,214).

For one-step desalting by reverse osmosis of strongly salty water such as sea water, several special requirements are imposed upon the membranes. The polymeric materials employed for such membranes must have a characteristic salt rejection capability that is high enough to enable drinking water quality to be attained on the product water side of the process. This requires a salt rejection of more than about 99%, for salt depletion of the feed water from over 3.5% total salt content to less than 0.05%.

Such salt rejection capability must be realized in a membrane structure that has the thinnest possible cover sheet, so that a product water flow can be attained that is adequate for practical applications. The desalting cover sheet, moreover, must be exceptionally free from such defects as pores and inhomogeneities that would permit convective passage of unaltered feed water through it. This requirement increases in importance with increasing salt content of the water to be treated. In addition, desalting of sea water, as compared to the treatment of merely brackish water, requires the membrane to have an increased resistance to compacting under pressure, because mechanical compacting of the membrane tends to decrease the yield of product water. Compacting of the membrane is particularly a problem with the desalting of sea water because the required working pressure of the feed water is governed by its osmotic pressure and must therefore be higher for sea water desalting than for treatment of brackish water. Thus, along with adequate salt rejection and adequate flow capacity, the best possible flow stability should also be available from a membrane employed for sea water desalting, that is, its rate of production of desalted water should not decrease excessively during a long period of subjection to operating pressure.

These requirements have not been satisfied by integral-asymmetrical membranes of cellulose diacetate produced according to the heretofore conventional method outlined above. It is true that they typically provide good flow capacities when used for the desalting of brackish water, but they are nevertheless unsuitable for the desalting of sea water, particularly in relation to flow stability and capacity for restraining passage of salt.

It is known that the inherent salt restraining capacity of cellulose acetate increases with increasing degree of acetylization, up to the threshold of fully acetylated cellulose triacetate; but this increase in salt restraining capability is accompanied by an increasing and undesired densification towards water as well as salt. A cellulose acetate of natural origin with an increased degree of acetylization behaves like a mixture of cellulose diacetate and cellulose triacetate in consequence of production-conditioned statistical variations in the distribution of the acetyl groups in the polymer chains. It has therefore been proposed that gradually increased adjustments of acetate content be obtained by employment of corresponding mixtures of two cellulose acetates (U.S. Pat. No. 3,497,072). A substantial difficulty with this procedure lies in the markedly differing solubility characteristics of the two cellulose acetate types in the organic solution media that are suitable for membrane production, which, in the end, prevent the expected benefits of the cellulose triacetate portion from being realized in full measure and without disadvantageous side effects. Thus, for example, cellulose triacetate is insoluble in acetone, which is a preferred solvent medium, whereas cellulose diacetates are explicitly classified as acetone-soluble acetates. With the inclusion of further solvent media, particularly dioxane, it becomes possible to prepare homogeneous casting solutions with both of these cellulose acetates, but the viscosity of such a casting solution rises so abruptly with increasing proportions of cellulose triacetate that even with the employment of short-chain cellulose triacetate it becomes practically impossible to ensure that the casting procedure (step (b) in the foregoing example) will result in a film that is free from defects. The most suitable viscosity range for the casting solution lies between 5,000 and 7,000 cP with a minimal concentration of 12% by weight of membrane forming polymer; above a viscosity of, at most, 10,000 cP, reproducible membrane production is not possible.

To attempt to avoid defects by producing a heavier cover sheet, as by lengthening the evaporation time (step (c)), obviously entails a sacrifice of permeability to product water and, in addition, increase the danger of demixing of the two polymer components. The tendency towards demixing exists most markedly in the immersion step of the production process (step (d)), in which gelling of the membrane takes place while the swelling medium and the solvent medium are exchanged for water. When this exchange proceeds at different speeds for the several components of the casting solution, the mixture undergoes a premature precipitation of the heavier soluble cellulose triacetates, with the result in many cases that the cellulose triacetate is dispersed into isolated areas in a membrane otherwise composed of cellulose diacetate, and the increase in salt rejecting capacity that has been sought is not realized.

There have been previous attempts to employ certain minerals as fillers to improve the long-term flux stability of cellulose acetate membranes. See, for example, the article by I. Goossens and A. Van Haute in *Desalination*, No. 18 (1976), p. 203. Goossens and Van Haute incorporated from about 3% to over 20% by weight of mineral filler material in otherwise conventional casting solutions. Although they found that certain mineral fillers brought about some improvement in compaction resistance, and hence in long-term flux stability, they also found that the incorporation of such fillers caused a decrease in salt rejection, and therefore the membranes containing them were generally not suitable for sea water desalting, although possibly useful for desalting brackish water. From the standpoint of the present invention it is noteworthy that one of the mineral fillers tested by Goosens and Van Haute was Bentone-38, a hectorite (magnesium silicate) having a coating of an ammonium organic derivative. They observed that this filler seemed to have less adverse effect upon salt rejection than others that they tested, but that "there is a suddenly strong decrease of rejection at lower filler concentrations for these membranes."

The above mentioned West German Pat. No. 2,552,282, published in 1977, discloses an integral-asymmetrical membrane produced from a casting solution into which was incorporated a very small percentage of hydrophilic bentonite (Montmorillonite or Hectorite) that contained exchangeable cations. The casting solution was otherwise generally conventional, consisting of a water-swelling polymer, a solvent medium and a swelling medium. The bentonite was incorporated as a thixotropic agent to improve the castability of the casting solution and the homogeneity of the resulting membrane. The bentonite was first swollen in water, in a mixture of 1 to 5 parts by weight of bentonite to 50 parts by weight of water, and this suspension was then mixed with 50 to 100 parts by weight of the solvent medium (for example, acetone) for the casting solution. The mixture was then added to the casting solution in an amount such that there was 0.1 gram of bentonite in every 100 grams of casting solution. At, for example, a 98% salt rejection there was a substantial improvement in product water flow as compared to a comparable membrane in which the bentonite was not incorporated, but there was only a negligible improvement in flux stability. A membrane in which bentonite was incorporated in accordance with the disclosure of this West German patent could achieve a maximum salt rejection of about 98% at a practical product water flow rate. Although this was somewhat better than an otherwise identical membrane without the bentonite, it was not good enough for sea water desalting, which requires that salt rejection at practical flux rates must be better than 98.9%.

In general, therefore, it can be said that previous attempts to improve any one of the three characteristic properties of reverse osmosis membranes—flux or desalted water production rate, salt rejection capability, and pressure-related flux stability during an extended period of use—have invariably led to a corresponding loss in one or both of the other two. Furthermore, it has not heretofore been known how to produce a reverse osmosis membrane that was capable of producing product water of potable quality from sea water (in distinction to merely brackish water) at practical production rates and with adequate flow stability through a reasonable operating life on the order of thirty days or more.

SUMMARY OF THE INVENTION

The general object of the present invention is to achieve the practical effect of obtaining a high salt-restraining capacity for reverse osmosis sea water desalting with a relatively small proportion of cellulose triacetate in the polymer mixture of the casting solution, so that the known desirable effects of cellulose triacetate can be carried over, unreduced, into very thin membrane sheets that afford a high product water flow, without danger of forming defective spots or of dissociation.

More specifically, therefore, the object of the present invention is to provide a process for producing cellulose acetate membranes with increased acetyl content, which process generally follows the known procedure for the production of integral-asymmetrical membranes but nevertheless at every step resolves the heretofore existing incompatibility between the constituent polymer components.

It is also an object of the invention to provide an integral-asymmetrical membrane that is suitable for sea water desalting by reverse osmosis, possessing satisfactorily high salt restraining capability along with unusually high product water flow and flow stability.

In general, the invention is based upon the discovery that certain organophilic modified bentonites, in swollen condition and incorporated into the casting solution in suitably small percentages, can assume the function of a membrane swelling medium (similar to the function of the formamide in the typical prior casting solution mentioned above) and, in addition, by virtue of their thixotropic characteristics, have the capacity to substantially improve the spreadability of high viscosity casting solutions while at the same time improving the upper surface development of the freshly cast film.

As a water-insoluble absorption medium, organic bentonites employed according to the invention afford a special characteristic in that—unlike the water-soluble substances conventionally employed for this function—such bentonites remain in the membrane during the immersion and gelling process and, by slow emission of solvent medium, prevent a demixing of the polymer components. The stabilizing action of the swelling medium remaining in the membrane transfers itself to the compaction behavior of the membrane, which now comprises three solid components, and results in its having an increased flow stability.

The invention resides in an integral-asymmetrical membrane suitable for salt water desalting by reverse osmosis, having a relatively thin, substantially non-porous layer essentially of cellulose acetate polymer and a thicker layer of essentially the same cellulose acetate polymer with a substantially porous structure, said membrane being characterized by: organophilic bentonite incorporated in the material of the membrane as a swelling medium in a proportion not greater than 1 to 75 by weight and preferably on the order of 1:100. The meaning of "organophilic bentonite" as used herein is explained below.

The invention also resides in a process for producing a semi-permeable asymmetrical membrane from a casting solution comprising water insoluble polymers, solvent media and swelling media, characterized by: incorporation in the casting solution of organophilic bentonite which has been swollen in an organic medium that is a solvent for said polymers. In the preferred cases the organophilic bentonite content of the casting solution is on the order of 0.07 to 0.1 percent of the membrane material by weight. In a preferred practice of the invention said organic medium is a mixture of dioxane and acetone. Further, the preferred practice of the method is characterized by the addition of methanol to the casting solution after the polymers and bentonite portions have been fully dissolved and homogenized therein.

BRIEF DESCRIPTION OF DRAWING

The accompanying flow chart shows the several successive steps of the method of this invention in the mode of practice thereof that is now preferred.

DETAILED DESCRIPTION OF THE INVENTION

The organophilic bentonites employed according to the invention consist of extremely finely divided flake-shaped clay minerals of the Montmorillonite type (aluminum silicate), the exchangeable cations of which are replaced through quaternary ammonia binding with long chain hydrocarbons which form the organic portion of the organophilic bentonites:

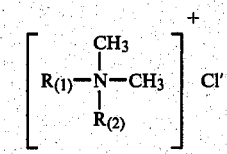

wherein $R_{(1)}$ and $R_{(2)}$ designate alkyls such as $C_{18}H_{37}$ and $C_{16}H_{33}$, or $C_{12}H_{25}$, and the like. Such replacement of cations by long chain hydrocarbons occurs as a result of directly reacting Montmorillonite with di-methyl-di-stearyl (quaternary) ammonium chloride. Thus, in general, the organic groups of the organophilic bentonites consist of quaternary ammonium groups, the four ligands of which are composed of hydrocarbon chains with 1 to 20 carbon atoms.

The various commercially available organophilic bentonites differ from one another primarily in type and length of hydrocarbon chains, that is, in the nature of their organic portions. Bentonite preparations of the aluminum-silicate type, directly reacted with di-methyl-di-stearyl (quaternary) ammonium chloride, have proven especially suitable for the present purpose. One such preparation is commercially available under the trade name Tixogel VG (SüdChemie AG, Munich).

In the conventional commercial powder form, the hydrocarbon chains coat the individual flakes of the clay minerals with an organic water repellant sheet through supplementary valence forces. With the addition of a suitable organic solvent medium, the hydrocarbon chains, by reason of preferred absorption by the solvent medium, are displaced from the outer surface of the clay mineral flakes and disperse.

The dispersion of the hydrocarbon chains, during which the clay mineral flakes increasingly separate from one another, puts into effect the process of gelling or swelling of the organophilic bentonite. The obtainable degree of gelling or swelling depends upon the polarity of the organic solvent medium used for the swelling. The preferred solvent medium mixture for cellulose diacetate and triacetate—namely dioxane and acetone—is likewise especially suitable for swelling organic bentonites employed in accordance with the principles of this invention, in that comparable and concurrent reciprocal relations can be established between the solvent medium and the cellulose acetates and between the solvent medium and the swollen bentonites.

In accordance with the present invention, the organophilic bentonites are swollen in dioxane, either by stirring them into dioxane during warming or by working them in at high shearing forces with the use of a ball mill or dissolver, and they attain swelling, in a mixture ratio of bentonite to dioxane that is on the order of 1:500 but specifically depends upon the formulation of the casting solution. The smallest ratio for preparation of a stiff gel with this preparation is about 1:10.

The rest of the non-polymer water soluble components of the casting solution, which do not remain in the membrane, are known in themselves and have their conventional roles in the membrane production process. Thus, acetone is included as a conventional vaporizable solvent medium for cellulose diacetate. Acetic acid is incorporated for its two-fold function as a solvent medium for cellulose triacetate and as a softener which improves polymer mobility for development of the desired membrane structure both during the evaporation phase and during the final gelling in water. In this latter function the acetic acid assists the action of the organophilic bentonite swelling medium.

A further component that should be added to the casting solution after it is fully matured with respect to its polymer and bentonite components is a non-solvent for the polymer content materials which evaporates at room temperature. Methanol is preferred for this purpose, and it is so proportioned in accordance with the total formula for the casting solution that the limit of polymer solubility (precipitation limit) is approached but in no event exceeded. By reason of this incorporation, a quick skin formation is obtained on the upper surface of the freshly spread film (this effect is known from lacquer technology) without consequent loss of the polymer mobility that is advantageous for the orderly development of an upper surface structure, since the evaporation of the methanol signifies a transient solubility improvement for the membrane forming cellulose acetate in the upper surface region of the film.

As a water-soluble polymer-non-solvent, methanol has swelling medium properties in the sense of the teachings of U.S. Pat. No. 3,497,072 mentioned above, which is to say that in itself it stimulates the absorption of water by the membrane, and hence tends to increase the flow capacity of the membrane; but as used by itself the increase in flow capacity that it brings about is accompanied by an offsetting loss of salt rejecting capability. However, in combination with the bentonite swelling medium, the flow-increasing effect of the methanol medium in the membrane of the present invention is obtained without sacrifice of salt rejecting capability.

Having in mind the necessarily complex relationships in the membrane forming and producing process, the essential advantages of the employment of organophilic bentonite preparations for the production according to the invention of cellulose acetate membranes with high salt rejecting capacity are here summarized:

(a) Swollen bentonites as constituents of the casting solutions make possible the processing of poorly soluble membrane polymers that results in high solution viscosities because, owing to the thixotropic operation of the bentonites, the viscosity of the casting solution is reduced in the step of spreading the solution through a narrow slot;

(b) As water insoluble swelling media, the incorporated bentonites delay the process of exchange of solvent medium and water-soluble additives for water during the gelling phase of the film, thereby raising the degree of order of the polymer matrix and preventing local tension defects in the desalting skin;

(c) In like manner the bentonites act against demixing of the polymer components, thereby also diminishing the development of local defects, thus affording high reproduceability of film production; and (d) The orderly deposition of the swollen bentonites in the polymer matrix diminishes its tendency to compaction under pressure loading and thereby improves the flow stability of the membranes.

In the following examples, the method of producing semi-permeable membranes for water desalting will be illustrated by way of three specific examples of formulations according to the invention, differing as to specific proportions but otherwise processed in identical fashion, as explained.

EXAMPLES

The formulations of three typical casting solutions are given in the following tabulation in percentages by weight:

|  | I | II | III |
|---|---|---|---|
| Bentonite[1] | 0.07 | 0.07 | 0.10 |
| Cellulose diacetate[2] | 7.30 | 7.00 | 7.30 |
| Cellulose triacetate[3] | 7.30 | 7.00 | 7.30 |
| Dioxane | 47.40 | 45.70 | 47.40 |
| Acetone | 18.20 | 17.60 | 18.20 |
| Acetic Acid | 8.75 | 8.50 | 8.75 |
| Methanol | 10.98 | 14.13 | 10.95 |

[1]Tixogel VZ
[2]Eastman 40-25
[3]Bayer T 700

Preparation of the casting solution was in each case begun by swelling the organophilic bentonite in dioxane, in the indicated proportions, and then adding the acetone. The cellulose triacetate was then introduced into the solvent medium-swelling medium mixture thus prepared and was dissolved and homogenized within 48 hours without shearing force, as for example in a slowly running roller mixer. The cellulose diacetate and acetic acid were then added and worked in during a further 24 hours. Finally, the methanol was introduced slowly, to avoid local inhomogeneities. After a final maturation period of 12 to 24 hours at 4° to 10° C., the casting solution was spread.

For membrane formation, the casting solution is spread out into a film through a slit having a defined slit height of 0.25 to 0.35 mm. onto a smooth casting surface. The casting surface can be a manually moved glass plate, for production of laboratory quantities, or a mechanically advanced steel belt, for practical application quantities. The cast film is allowed to evaporate during a period of 20 to 30 seconds at room temperature, preferably 23 seconds at 20° C., and during evaporation suitable shielding is provided to ensure turbulence-free emission of the volatile casting medium components. The evaporation period is terminated by immersing the film in a gelling bath which, in the simplest case, is cold water at 1° to 3° C. In the gelling bath, which continues for a period of 90 minutes, water is exchanged for the water soluble components that still remain in the film.

The film is then transferred to the warm water annealing bath in which the already established structure of the membrane is standardized to the salt rejecting capacity required for the desalting application, that is, the membrane is densified. Since this densification necessarily affects the product water flow rate as well as the salt rejecting capacity, the temperature and duration of this annealing treatment are so chosen that the desired salt rejecting capacity will be exactly attained, with the maintenance of the best possible flow capacity.

In this connection, it is appropriate to describe the performance characteristics of high salt retention membranes by specifying the product water flows obtainable at given salt rejecting capabilities. Such performance data are here given for membranes made in accordance with the foregoing specific examples after each had been subjected to a tempering treatment that was selected to be uniform for all of them and consisted of ten minutes at 88° C., performance being shown for the membrane of each formulation in comparison to a control membrane produced by an identical process but from a formulation that did not include bentonite.

|   |                | Flow (1/m² day) | Retention (%) | Compaction |
|---|----------------|-----------------|---------------|------------|
| I | With bentonite | 440             | 98.0          | —          |
|   | Without        | 395             | 97.9          | —          |
| II| With bentonite | 503             | 99.2          | −0.02727   |
|   | Without        | 477             | 99.0          | −0.07837   |
|III| With bentonite | 411             | 99.1          | —          |
|   | Without        | 395             | 97.9          | —          |

The test conditions under which these data were obtained were as follows: feed water 35,000 p p m saline solution (corresponding to sea water concentration); working pressure 100 bars; working temperature 25° C. The test apparatus corresponded to 5 m² of membrane area.

As the data show, membranes produced according to the invention display consistently higher product water flows and improved salt retention as compared to the control membranes. It is worth mentioning that for rejection capacities over 98%, steps of substantially one-tenth of a percentage point constitute significant improvements. Improved reproduceability is also apparent from the insignificant scattering of measured values.

In relation to the respective desalting levels, the absolute gain in flow capacity of membranes according to the invention, in comparison to the control membranes, is larger than it appears from the face of the tabulation, since without the incorporation of bentonite the relative level of desalting in any given case is only attained in consequence of a higher annealing treatment temperature, with consequently diminished flow capacity. The treatment of the membranes incorporating bentonite for which information is given in the table was selectively directed to compaction for ensuring adequate salt rejection capacity. The compaction given in the foregoing table, being the slope of the line for product water flow plotted against working time on a double logarithimic graph, is a measure of flow stability. The remarkably diminished compaction, which ensures improved flow stability, is undoubtedly recognizable from the example cited in the table.

From the foregoing explanation it will be apparent that this invention provides an integral-asymmetrical semipermeable membrane, and a method of producing the same, that is particularly suitable for sea water desalting by reverse osmosis by reason of its having a high capability for salt rejection accompanied by unusually high product water flow capacity in relation to salt retention, and having good flow stability.

We claim:

1. A semi-permeable asymmetrical membrane suitable for water desalting by reverse osmosis, consisting uniformly throughout the whole thereof essentially of cellulose acetate polymers and swelling medium but in the form of a relatively thin nonporous layer and a thicker porous layer, said membrane being the product of a process characterized by:

A. working organophilic aluminum silicate bentonite into an organic medium which is a solvent for at least a portion of said cellulose acetate polymers, to swell the organophilic bentonite; and B. adding the swollen organophilic bentonite to cellulose acetate polymers and solvents for the same to form a casting solution from which the membrane is cast and wherein the swollen organophilic bentonite constitutes between about 0.07% and 0.2% by weight of the complete casting solution.

2. A cast, semi-permeable asymmetrical membrane suitable for water desalting by reverse osmosis, the material of said membrane consisting uniformly, throughout the whole thereof, essentially of cellulose acetate polymers and swelling medium, but being in the form of a relatively thin nonporous layer and a thicker porous layer, said membrane being characterized by:

the material of said membrane including, as a swelling medium, organophilic aluminum silicate bentonite which has been swollen in an organic medium that is a solvent for at least a portion of said cellulose acetate polymers, said organophilic bentonite being present in an amount equal to between substantially 0.07% and substantially 0.2% by weight of the complete solution from which the membrane is cast.

3. A process for producing, from a casting solution comprising water swellable cellulose acetate polymers, solvent media and swelling media, a semi-permeable asymmetrical membrane that is suitable for water desalting by reverse osmosis, said membrane consisting uniformly essentially of cellulose acetate polymers and swelling medium throughout the whole thereof but having a relatively thin layer of substantially nonporous structure and a thicker layer of porous structure, said process being characterized by:

A. working organophilic aluminum silicate bentonite into an organic medium which is a solvent for at least a portion of said cellulose acetate polymers to swell the organophilic bentonite; and B. homogenizing into the casting solution, before casting, an amount of the swollen organophilic bentonite such that the same constitutes between about 0.07% and 0.2% by weight of the complete casting solution.

4. The process of claim 3 wherein said organic medium is a mixture of dioxane and acetone.

5. The process of claim 3 wherein said organophilic bentonite is first swollen in dioxane and thereafter acetone is added thereto.

6. The process of claim 3, further characterized by:

C. adding methanol to the casting solution after the polymers and swollen bentonite portions have been fully dissolved and homogenized therein.

7. The process of claim 3 wherein said polymers consist essentially of cellulose diacetate and cellulose triacetate in substantially equal parts by weight.

8. The process of claim 3 wherein said organophilic aluminum silicate bentonite has organic groups that consist of quaternary ammonium groups, the ligands of which are composed of hydrocarbon chains with one to twenty carbon atoms.

9. A process for producing a cast semi-permeable asymmetrical membrane suitable for water desalting by reverse osmosis, consisting uniformly throughout the whole thereof essentially of cellulose acetate polymers and swelling medium but in the form of a relatively thin layer of substantially nonporous structure and a thicker layer of porous structure, said process being characterized by:

A. working organophilic aluminum silicate bentonite into an organic medium which is a solvent for at least a portion of said cellulose acetate polymers to swell the organophilic bentonite; and
B. adding cellulose acetate polymers and solvents for the same to said swollen organophilic bentonite and mixing them therewith to produce a casting solution from which the membrane is cast and in which the swollen organophilic bentonite constitutes between about 0.07% and 0.2% by weight of the complete casting solution.

10. The process of claim 9, further characterized by:
C. adding methanol to, and mixing it with, said swollen organophilic bentonite, said cellulose acetate polymers and said solvents for the same.

* * * * *